United States Patent [19]

Bianchi et al.

[11] Patent Number: 4,830,721

[45] Date of Patent: May 16, 1989

[54] ELECTROCHEMICAL DEOXYGENATION PROCESS FOR CORROSION CONTROL IN DEIONIZED WATERS

[75] Inventors: Giuseppe Bianchi, Milan; Giuseppe Faita, Novara, both of Italy

[73] Assignee: S.E.R.E. S.r.l., Milan, Italy

[21] Appl. No.: 146,813

[22] Filed: Jan. 22, 1988

[30] Foreign Application Priority Data

Jan. 26, 1987 [IT] Italy .................................. 19163 A/87

[51] Int. Cl.⁴ .......................... C02F 1/46; C25B 15/08
[52] U.S. Cl. .................................... 204/151; 204/237;
204/255; 204/257; 204/263; 204/283
[58] Field of Search ................ 204/151, 237, 255–256,
204/257–258, 263–266, 228, 283, 129

[56] References Cited

U.S. PATENT DOCUMENTS

| | | | |
|---|---|---|---|
| 4,098,667 | 7/1978 | Chillier-Duchatel | 204/237 X |
| 4,527,626 | 7/1985 | Cantu et al. | 204/129 X |
| 4,536,263 | 8/1985 | de Nora et al. | 204/252 X |

Primary Examiner—Donald R. Valentine
Attorney, Agent, or Firm—Bierman and Muserlian

[57] ABSTRACT

The present invention relates to an electrochemical process for deoxygenating deionized water utilizing a membrane electrolyzer and optionally a catalytic reactor, characterized in that operation is carried out at ambient temperature avoiding the need for the addition of substances, dangerous for the health of the operators, able to pollute the environment or cause undesired increase of the concentration of dissolved salts.

7 Claims, 3 Drawing Sheets

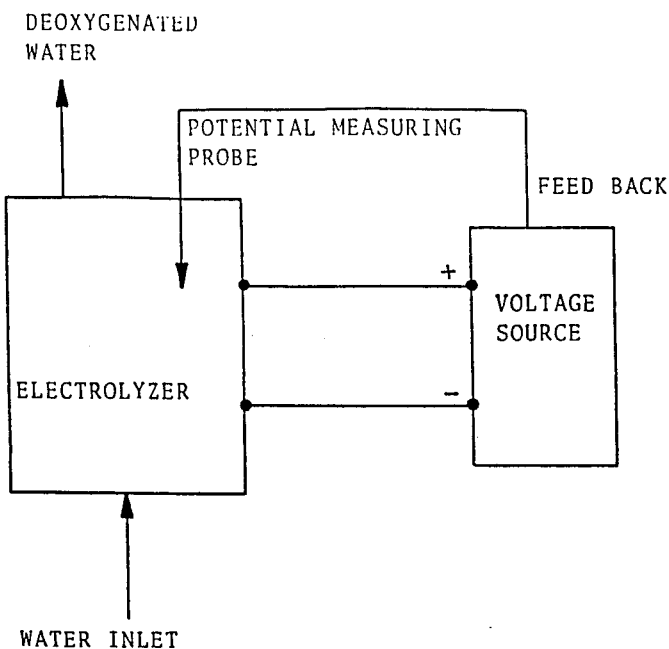
Fig. 3,a
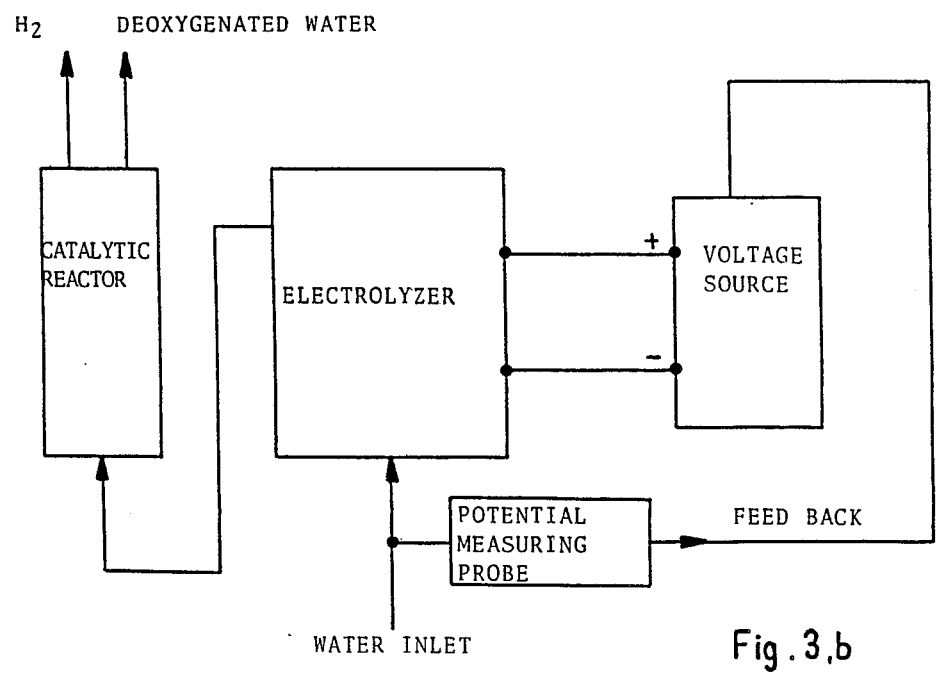
Fig. 3,b

4,830,721

ELECTROCHEMICAL DEOXYGENATION PROCESS FOR CORROSION CONTROL IN DEIONIZED WATERS

DESCRIPTION OF THE INVENTION

The oxygen naturally contained in neutral waters causes corrosion of iron and metal alloys and the greater the oxygen concentration the higher the corrosion degree is. Indicatively, water at the equilibrium state with the atmosphere contains some milligrams/liter of oxygen or, as hereinafter reported, some parts per million (ppm) of dissolved oxygen.

The conventional methods for obtaining protection against corrosion are substantially based on two main principles:
  addition of corrosion inhibitors (e.g. phosphates, zinc-phosphonates)
  water deoxygenation.

Methods based on addition of inhibitors are utilized when the circuit wherein water circulates permits a continuous inlet of oxygen, such as in once-through cooling circuits, air-cooled tower recirculating systems. In these cases, the addition of inhibitors would involve unacceptable costs.

Conversely, water deoxygenation results efficient in closed circuits, wherein oxygen seeping is negligible such as in secondary cooling circuits, boiler feed waters and condensate return systems. In these cases, corrosion is efficiently reduced if the residual concentration of oxygen is in the range of some micrograms/liter or, as hereinafter indicated, parts per billion (ppb).

Water deoxygenation may be carried out by physical or chemical methods as well as by the electrochemical method, as in the present invention.

Physical deoxygenation is usually carried out by means of a degaser, in which steam is added to the water to be treated. Deoxygenation is thus obtained as result both of the reduced solubility of oxygen due to the temperature increase and to the reduced stripping action brought about by the steam bubbles. This method, which allows for a considerable reduction of the oxygen content, to obtain a value of some ppb, is affected by severe shortcomings. The size of the degaser cannot be too small and therefore use is limited to medium-large power plants. The deoxygenated water is rather hot and this inhibits use in cooling circuits, unless deoxygenation is carried out under vacuum which involves further problems due to the considerable increase of size and to the use of vacuum pumps.

Chemical deoxygenation is carried out by adding to the water strongly reducing agents (hydrazine, sulphites) in the same quantity as the quantity of oxygen contained in the water. The advantages and the problems connected with the use of hydrazine are:
  formation of water and nitrogen due to the reaction with oxygen, without accumulation of ionic species;
  ready and quick reaction with oxygen under high temperature. Below 100° C. the reaction is slow and incomplete unless suitable catalysts are used, which complicate the chemistry of the system, or a remarkable excess is utilized, in the range of hundreds of ppm;
  hydrazine is a cancerous substance and poses problems for its handling. The substituted hydrazine recently proposed does not overcome the problem.

The use of sulphite involves the following advantages and disadvantages:
  reaction is quick and complete also at ambient temperature without the need for an excess;
  sulphite reacts with oxygen forming sulphate which, remaining in the treated water under ionic form, increases water conductivity;
  in closed circuits, wherein small amounts of oxygen seeping through defective sealings are to be continuously removed, the continuous addition of sulphite increases the salts content, unless the circuit is provided with a mixed ion-exchange resin bed or with a periodical or continuous blow-down.

Another chemical method consists in a catalytic process whereby hydrogen is physically dissolved in the water to be deoxygenated, in the same amount as the amount of oxygen to be eliminated. Water thus treated is fed to a catalytic reactor wherein hydrogen and oxygen combine to form water until the quantity of oxygen is reduced below 0.01 ppm (10 ppb).

This method permits to overcome the problems faced with the physical method or with the chemical one utilizing hydrazine or sulphites. However, it is still negatively affected by several disadvantages, in particular:
  hydrogen dissolution in water is slow especially when its concentration is close to the saturation point equal to about 1 ppm: this value corresponds to the quantity of hydrogen necessary to completely deoxygenate air-saturated water (i.e. containing about 8 ppm of oxygen). To speed up the hydrogen dissolution process, this operation is carried out under slight pressure, which involves the use of pumps and thus security problems.
  dosage is troublesome especially if automated on the basis of the oxygen content value in the water to be treated.

All the above illustrated methods leave problems unsolved in the case of small plants operating close to ambient temperature and requiring continuous, automated control as for example condensate circuits, the low-temperature areas of power plants, secondary cooling or heating circuits, process water treatment.

It is an object of the present invention to provide an electrochemical deoxygenation process especially directed to treat deionized water characterized in that operation is carried out at temperatures ranging from ambient to 200° C., without adding substances which could be dangerous either for the health of the operator, pollute the environment or increase the concentration of dissolved salts.

Obviously the method of the present invention is suitable also for deoxygenating water having a medium or high electrical conductivity.

The advantages offered by the present invention will be easily understood from the following detailed description and examples of typical embodiments thereof. Making reference to the drawings:

FIG. 3a is a schematic view illustrating an embodiment of a plant utilizing the electrolyzer of the present invention FIG. 3b is a schematic view of an alternative embodiment of a plant utilizing the electrolyzer of the present invention and a catalytic reactor.

Figure 1:
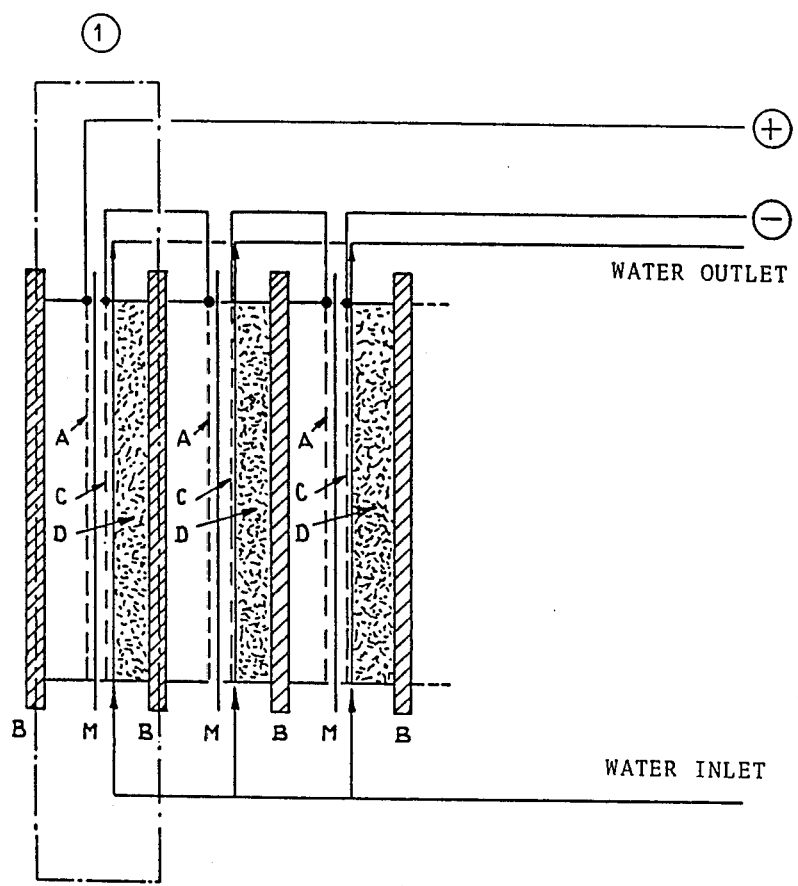
FIG. 1 is a schematic view of the electrolyzer for deoxigenating deionized water according to the present invention.

FIG. 1 is a schematic view of the electrolyzer of the invention, constituted by a certain number of electrolytic cells 1, defined by two end-plates B. The cell 1 is separated into an anode compartment and a cathode compartment by a membrane M. The cell container is made of plastic material or metal, depending on the operating temperature. An aluminum alloy is most preferred. The anode compartment is provided with anode A which supports the membrane M. The anode A comprises a perforated or expanded sheet or a coarse mesh screen having a sufficient thickness to provide for the required rigidity and perfect planarity of the structure and at least one thin, perforated, or expanded metal sheet or mesh screen spot-welded to the coarse screen or sheet. This anode structure is described in U.S. Pat. No. 4,536,263.

Suitable materials for the anode are stainless steel, nickel and alloys thereof, copper and alloys thereof, lead, valve metals activated by a suitable electrocatalytic coating, such as platinum group metals or gold. The selection of the most suitable material, besides obvious economical considerations, depends on the type of solution fed to anode compartment. Said solution may be constituted by deionized water or acid solutions: in any case a cation-exchange membrane is preferably used.

The cathode compartment comprises a cathode C and a distributor D, which presses cathode C against the membrane M which is supported by the anode A: this mechanical arrangement permits to avoid vibrations of the membrane during operation, and thus avoids damaging of the membrane due to abrasions or fatigue.

The cathode may be constituted by one or more perforated or expanded metal sheets or mesh screens, pressed against the membrane by the distributor.

The use of mesh screens is preferable as, at the same flow rate of deionized water, a higher localized turbulence is obtained in correspondence of the mesh knots and therefore a more efficient transport of dissolved oxygen towards the cathodic surface or a more complete dissolution of hydrogen in the water is attained. The use of fine screens is highly preferable as a more uniform current distribution on the membrane is obtained and the ohmic losses in the solution, which is characterized by a low electrical conductivity, are minimized.

Suitable materials for the cathodes are carbon steel, stainless steel, nickel and alloys thereof, copper and alloys thereof. Nickel and its alloys are most preferred as they exhibit a considerable resistance to corrosion to which the metal structure could be subjected during shut-downs, and besides this they are commercially available. The above metals may be coated by a metal exhibiting a high hydrogen overvoltage (e.g. lead).

The cathode compartment is fed with deionized water to be deoxygenated. The electric current penetrates the deionized water, perpendicularly to the flow direction, for some tenths of millimeter with negligible ohmic losses, notwithstanding the scarce conducibility of deioniezd water.

The electrolyzer illustrated in FIG. 1 is constituted by a series of electrolysis cells assembled in a filter-press arrangement. The electrical connection may be either in series as shown in FIG. 1 or with monopolar electrodes and internal electrical connections.

The deionized water flow to the cathode compartment may be either in parallel or in series.

During operation, utilizing a cation-exchange membrane, the following reactions take place:
cathode (I) $O_2 + 4H^+ + 4e \rightarrow 2H_2O$ (II) $4H^+ + 4e \rightarrow 2H_2$ anode (III) $2H_2O - 4e \rightarrow O_2 + 4H^+$ The cathodic reaction II, which gives rise to the formation of molecular hydrogen, takes place at a voltage E(II) more cathodic than E(I) of reaction I, by which molecular oxygen, dissolved in water, is reduced. Reaction II takes place when exceeding said value E(II) under controlled potential conditions or, alternatively, under controlled current conditions, when the current load exceeds the threshold value I(L) corresponding to the maximum diffusion rate of oxygen towards the cathode surface. This I(L) value amounts to about 10 Ampere/square meter of cathode surface, when water is air-saturated and linearly decreases as the dissolved oxygen quantity decreases.

Said I(L) value requires a high turbulence in the deionized water flowing along the cathode surface, e.g. in the range of 0.5–1 meter/second as will be described in Example 1.

A second threshold value I(C), in the range of 100 Ampere/square meter depending on the operating conditions, defines a boundary. Below said value the discharged hydrogen dissolves in water, whereas above said value hydrogen bubbles are formed.

It must be noted that hydrogen may dissolve in water above the saturation value (about 1 ppm at atmospheric pressure and ambient temperature). As a matter of fact, the bubbles nucleation and growth require a certain degree of oversaturation (see Encyclopedia of Electrochemistry of the Elements—A.J. Bard Editor - Vol. 9 - Part A - 3 - page 413 - Marcel Dekker New York 1982).

Figure 2:
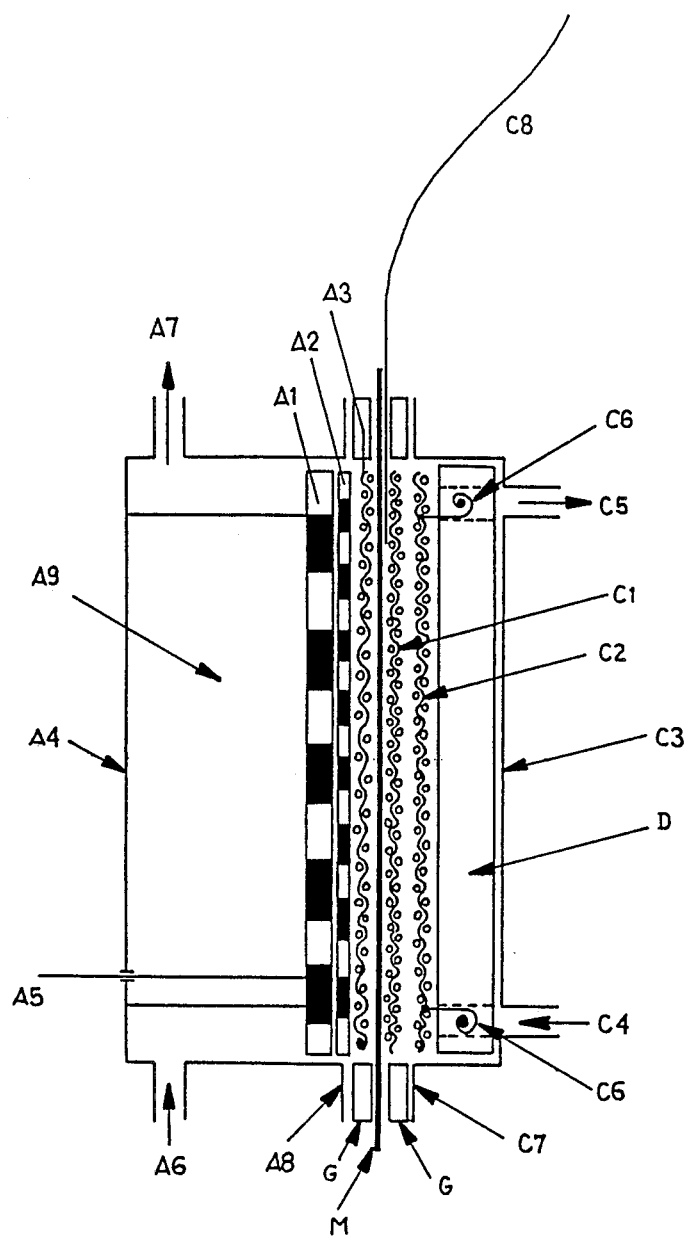
FIG. 2 is a schematic view of a cell constituting the electrolyzer of FIG. 1

The cell of FIG. 2 comprises a multi-layer anode (A1, A2, A3) in the anode compartment (A4), a cation-exchange membrane (M), a cathode (C1) in the cathode compartment (C3), peripheral gaskets (G), a spacer (C2) and a fluid distributor (D).

The anode compartment (A4) is provided with a bottom inlet (A6), a top outlet (A7) for the anolyte and the gas evolved at the anode, internal, longitudinal ribs (A9), a peripheral flat flange (A8) and suitable current conductor (A5) welded to the anode. The anode comprises a coarse expanded metal sheet (A1), welded to the ribs (A9), an intermediate-thickness, expanded metal sheet (A2) spot-welded to sheet (A1) and a fine metal fabric (A3) in contact with sheet (A2) and laying in the same plane as gasket (G).

The cathode compartment (C3) comprises a cathode (C1) constituted by a metal fabric, and a spacer (C2) constituted by an expanded metal sheet pressed against the cathode (C1) by a distributor (D) made of an elastic polymeric material and provided with two hollow slots in correspondence of the deionized water inlet (C4) and upper outlet (C5). The spacer (C2) is connected to current conducting means (C6). The cathode compartment (C3) further comprises peripheral flanges (C7), and a flat, potential measuring probe (C8) constituted by a cation-exchange membrane strip protected by an insulating jacket. One end of said probe (C8) is inserted into the cell compartment between the membrane (M) and the cathode (C1), the opposite end connected to a reference electrode.

A particularly preferred material for the electrodes is nickel.

FIG. 3a is a sketch of a plant utilizing the electrolyzer of the present invention for producing deoxygenated water with no hydrogen dissolved therein. In this particular embodiment, the plant is operated under potential-controlled conditions so that hydrogen discharge is prevented.

FIG. 3b is a sketch of a plant utilizing the electrolyzer of the invention in combination with a catalytic reactor. At the electrolyzer outlet, water is partially deoxygenated and still contains oxygen and hydrogen in stoichiometric amount. Said partially deoxygenated water is fed to the catalytic reactor wherein hydrogen and oxygen are combined to form water. In this embodiment, the electrolyzer is operated under current-controlled conditions, the current value being proportional to the oxygen content of the feed water. The catalytic reactor is of the fixed-bed type and comprises a catalyst suitable for favoring the re-combination of hydrogen and oxygen to form water.

A suitable catalyst may be supported palladium which allows for obtaining a residual oxygen content at the catalytic reactor outlet lower than 0.01 ppm (10 ppb). If the hydrogen content at the reactor inlet is higher than the stoichiometric value, the catalytic re-combination is more rapid, and thus the operation time and the amount of catalyst may be reduced. At the reactor outlet, the excess hydrogen may be suitably stripped and collected.

When operating at temperatures higher than 80° C., the catalyst may be constituted by a porous carbon bed or by thin activated metal screens.

It is to be intended that the invention is not limited to the specific examples reported hereinbelow.

EXAMPLE 1

A cell as illustrated in FIG. 2, having internal dimensions of $10 \times 100 \times 1000$ mm, provided with an anode, $100 \times 1000$ mm, comprising an expanded nickel sheet (A1), having a thickness of 3 mm, an expanded nickel sheet (A2), spot welded to sheet (A1), and a fine sheet (A3), constituted by an expanded nickel fabric made of wire, 0.2 mm thick, in contact with sheet (A2). A sulphonic cation-exchange membrane, $160 \times 1060$ mm, produced by E.I. Du Pont de Nemours was utilized. The cathode (C1) was constituted by a nickel fabric, $100 \times 1000$ mm, made of a nickel wire having a diameter of 0.2 mm and 64 meshes per square centimeter. The spacer (C2) was constituted by an expanded nickel mesh, 0.5 mm thick, having the same size as the cathode (C1) and pressed against the same by the distributor (D) made of elastic, polymeric material. The cell was further provided with rectangular gaskets (G) made of fabric-reinforced neoprene.

The cathode compartment was fed with deionized water having a conductivity of 1.5 microsiemens and containing 8 ppm of dissolved oxygen at ambient temperature, at a flow-rate of 100 liter/hour corresponding to a calculated linear speed of about 0.5 meter/second, the inlet pressure being about 0.4 atmosphere. Deionized water was fed to the anode compartment; under weak recirculation.

The electrolysis current load was 0.8 Ampere, corresponding to an average current density of 8 A/m2 and the cell voltage was 2.6 V.

The oxygen concentration at outlet (C5) was 5.6 ppm. A reduction to 70% the initial oxygen content was accomplished.

The cathode voltage was $-1.2$ V compared with a reference calomel electrode.

In order to have a confirmation of the above results, a further test was carried out with partially deoxygenated water having a residual concentration of 0.2 ppm of dissolved oxygen under an electrolysis current of 0.02 Ampere (0.2 Ampere/square meter) and 2.4 Volts. Also in this case a reduction to 70% the initial oxygen concentration was achieved.

EXAMPLE 2

A test carried out utilizing the same cell and same flow-rate as Example 1. The oxygen concentration in the deionized water was measured at the cell inlet by an oxygen measuring device which was connected as a feed back to the current source. In this way the electric current was adjusted automatically and resulted, as an average, about 2.8 Ampere. The oxygen concentration at the cell outlet decreased to about 5 ppm. The outlet water was fed to a fixed bed reactor containing a palladium-activated resin produced by Bayer AG under the commercial name of Lewatit MC 145. The reactor was a cylindrical column having a diameter of 10 cm, a height of 20 cm, with a volume of resin of about 1 liter. At the column outlet the oxygen content was about 0.03 ppm (30 ppb).

EXAMPLE 3

A test was carried out under the same general conditions as Example 2 but with deionized water containing 0.2 ppm of oxygen at the cell inlet, the flow-rate being 1000 liter/hour. The electric current resulted as an average, about 0.8 Ampere.

Upon treatment in the electrolyzer water was fed to a catalytic reactor, having a volume of 100 l. At the reactor outlet, the oxygen concentration was 0.02 ppm (20 ppb).

We claim:

1. Electrochemical process for deoxygenating deionized water containing oxygen dissolved therein carried out in a membrane electrolyzer comprising at least a unit cell containing an anode and a cathode separated by an ion-exchange membrane, said anode and said cathode having a foraminous structure and comprising at least one expanded metal sheet or one mesh screen made of a metal or a metal alloy optionally coated by an electrocatalytic film, said anode or said cathode exhibiting a sufficient rigidity and planarity in order to support said membrane, the respective cathode or anode being pressed against said membrane and sufficiently flexible in order to adapt to the membrane profile over substantially the entire surface of the membrane, said anode and said cathode being spaced apart for a distance corresponding substantially to the membrane thickness and providing for a multiplicity of contact points with the ion exchange membrane characterized in that said deionized water containing oxygen dissolved therein is fed to the cathode compartment of said unit cell, the cross section available to the flow of said deionized water being substantially the same as the cathode thickness, an auxiliary electrolytic solution or a second flow of deionized water is recycled to the anode compartment of said unit cell and an electrolysis current is applied to said cathode and anode.

2. The process of claim 1, characterized in that the cross section available for deionized water flow in said cathode compartment is obtained by interposing a deionized water distributor, substantially resilient and made of a polymeric material, between said cathode and the rigid wall of the cathode compartment.

3. The process of claim 2 characterized in that the electrolysis current is adjusted as a function of both the content of oxygen dissolved in the deionized water and the deionized water flow fed to said cathode compartment, to obtain a residue oxygen content at the electrolyzer outlet lower than 20 ppb, the hydrogen content being lower than 100 ppb.

4. The process of claim 2 characterized in that the electrolysis current and the deionized water flow fed to said cathode compartment are adjusted to obtain, at the outlet of the electrolyzer, a deionized water containing substantial amounts of dissolved oxygen and hydrogen stoichiometrically balanced, said deionized water being fed to a catalytic fixed bed reactor containing a catalyst suitable for promoting the recombination between oxygen and hydrogen and for reducing the oxygen content down to 20 ppb.

5. The process of claim 1 characterized in that the electrolysis current is adjusted as a function of both the content of oxygen dissolved in the deionized water and the deionized water flow fed to said cathode compartment, to obtain a residue oxygen content at the electrolyzer outlet lower than 20 ppb, the hydrogen content being lower than 100 ppb.

6. The process of claim 1 characterized in that the electrolysis current and the deionized water flow fed to said cathode compartment are adjusted to obtain, at the outlet of the electrolyzer, a deionized water containing substantial amounts of dissolved oxygen and hydrogen stoichiometrically balanced, said deionized water being fed to a catalytic fixed bed reactor containing a catalyst suitable for promoting the recombination between oxygen and hydrogen and for reducing the oxygen content down to 20 ppb.

7. Electrochemical process for deoxygenating deionized water containing oxygen dissolved therein carried out in a membrane electrolyzer comprising at least a unit cell containing an anode and a cathode separated by an ion-exchange membrane, said anode and said cathode having a foraminous structure and comprising at least one expanded metal sheet or one mesh screen made of a metal or a metal alloy, optionally coated by an electrocatalytic film, said anode or said cathode exhibiting a sufficient rigidity and planarity in order to support said membrane, the respective cathode or anode being pressed against said membrane and sufficiently flexible in order to adapt to the membrane profile over substantially the entire surface of the membrane, said anode and said cathode being spaced apart for a distance corresponding substantially to the membrane thickness and providing for a multiplicity of contact points with the ion exchange membrane characterized in that said deionized water containing oxygen dissolved therein is fed to the cathode compartment of said unit cell, the cross section available to the flow of said deionized water being substantially the same as the cathode thickness, an auxiliary electrolytic solution or a second flow of deionized water is recycled to the anode compartment of said unit cell, an electrolysis current is applied to said cathode and anode, and said electrolysis current and said flow of deionized water fed to said cathode compartment are adjusted to obtain, at the outlet of electrolyzer, a deionized water containing substantial amounts of dissolved oxygen and hydrogen stoichiometrically balanced, said deionized water being fed to a catalytic fixed bed reactor containing a catalyst suitable for promoting the recombination between oxygen and hydrogen and for reducing the oxygen content down to 20 ppb.

* * * * *